United States Patent [19]

Kotch

[11] 3,999,744
[45] Dec. 28, 1976

[54] APPARATUS FOR REMOVING FALLEN SLAG FROM BENEATH A FLAME CUTTING TABLE

[75] Inventor: Robert M. Kotch, Houston, Tex.

[73] Assignee: Gachman Steel Company, Houston, Tex.

[22] Filed: Aug. 27, 1975

[21] Appl. No.: 608,196

[52] U.S. Cl. .................................. 266/48; 266/65; 432/75; 432/67; 110/170; 15/93 R

[51] Int. Cl.² ......................................... F27D 23/00

[58] Field of Search ............ 432/2, 67, 70, 71, 74, 432/75; 15/93 R, 246; 34/85; 110/170; 431/119; 198/171, 172, 168, 204, 224, 226; 214/23, 25; 266/23 R, 23 N, 23 Q, 48, 65

[56] References Cited

UNITED STATES PATENTS

| 1,445,679 | 2/1923 | Gray | 432/2 |
|---|---|---|---|
| 2,463,595 | 3/1949 | Burns | 432/71 |
| 3,666,249 | 5/1972 | MacLeod, Jr. | 432/75 |
| 3,770,110 | 11/1973 | Boskovitch | 266/48 |

Primary Examiner—John J. Camby
Assistant Examiner—Henry C. Yuen
Attorney, Agent, or Firm—Wofford, Felsman, Fails & Zobal

[57] ABSTRACT

Disclosed herein is an improved apparatus for removing fallen slag from beneath a flame cutting table. A three-sided scoop is positioned below the table. Co-acting guide members are mounted along the sides of the scoop and the table. Chains are fastened to each side of the scoop and extend around vertically positioned sprockets at opposite ends of the table. The chain is located below a portion of the table guide member for protection from falling slag and heat. A motor engages the sprockets to drag the scoop from one end of the table to the other. A tube fastened to the table is positioned for carrying the returning chain.

7 Claims, 4 Drawing Figures

APPARATUS FOR REMOVING FALLEN SLAG FROM BENEATH A FLAME CUTTING TABLE

BACKGROUND OF THE INVENTION

1. Field of the Invention;

This invention relates in general to apparatus for removing fallen slag from beneath a flame cutting table, and more particularly to improvements in an apparatus utilizing a chain drawn scoop for raking the slag to one end.

2. Description of the Prior Art

While cutting metal on a gridded flame cutting table, slag will drop through the grids to the floor. Slag buildup on the floor generates heat and is difficult to remove if allowed to reach a significant depth.

Removing the slag regularly can be a particular problem if the flame cutting table is too large to easily be placed on its side or to be moved. There are known devices for use with large slag cutting tables. One such device is described in U.S. Pat. No. 3,666,249, issued May 30, 1972 to MacLeod, Jr. The apparatus described therein utilizes a scraper comprised of a single blade dragged by chains between I-beams. One sprocket is vertically mounted, while the other is horizontally mounted. Consequently the chain twists with one portion on one side of the I-beam and the other on the other side of the I-beam. The upper flange of the I-beam and deflector plates serve to protect the chain from slag.

While this device may be successful, improvements are desirable. On large tables, which may be 25 feet wide and 100 feet long, the scraper may become jammed along its track because of slightly different chain lengths. Also chain damage from heat of the slag may result if not properly protected.

SUMMARY OF THE INVENTION

It is accordingly an object of this invention to provide an improved apparatus for removing fallen slag from beneath a flame burning table.

Another object of this invention is to provide a fallen slag removing apparatus that utilizes an improved scraper or scoop, and guidance means.

Another object of this invention is to provide a fallen slag removing apparatus that utilizes an improved means to protect the chain from fallen slag and the heat generated thereby.

In accordance with these objects, a fallen slag removing apparatus is provided that utilizes a scraper or scoop having an end and two relatively long sides with lateral flanges, to which the chains are attached. Two opposing channel members extend underneath the table on either side of the scoop, defining a slot for the reception of the chain and flange. All sprockets are aligned vertically, and a tube is mounted above the channel members for protection of the return portion of the chain.

DESCRIPTION OF THE PREFERRED EMBODIMENT

Figure 1:
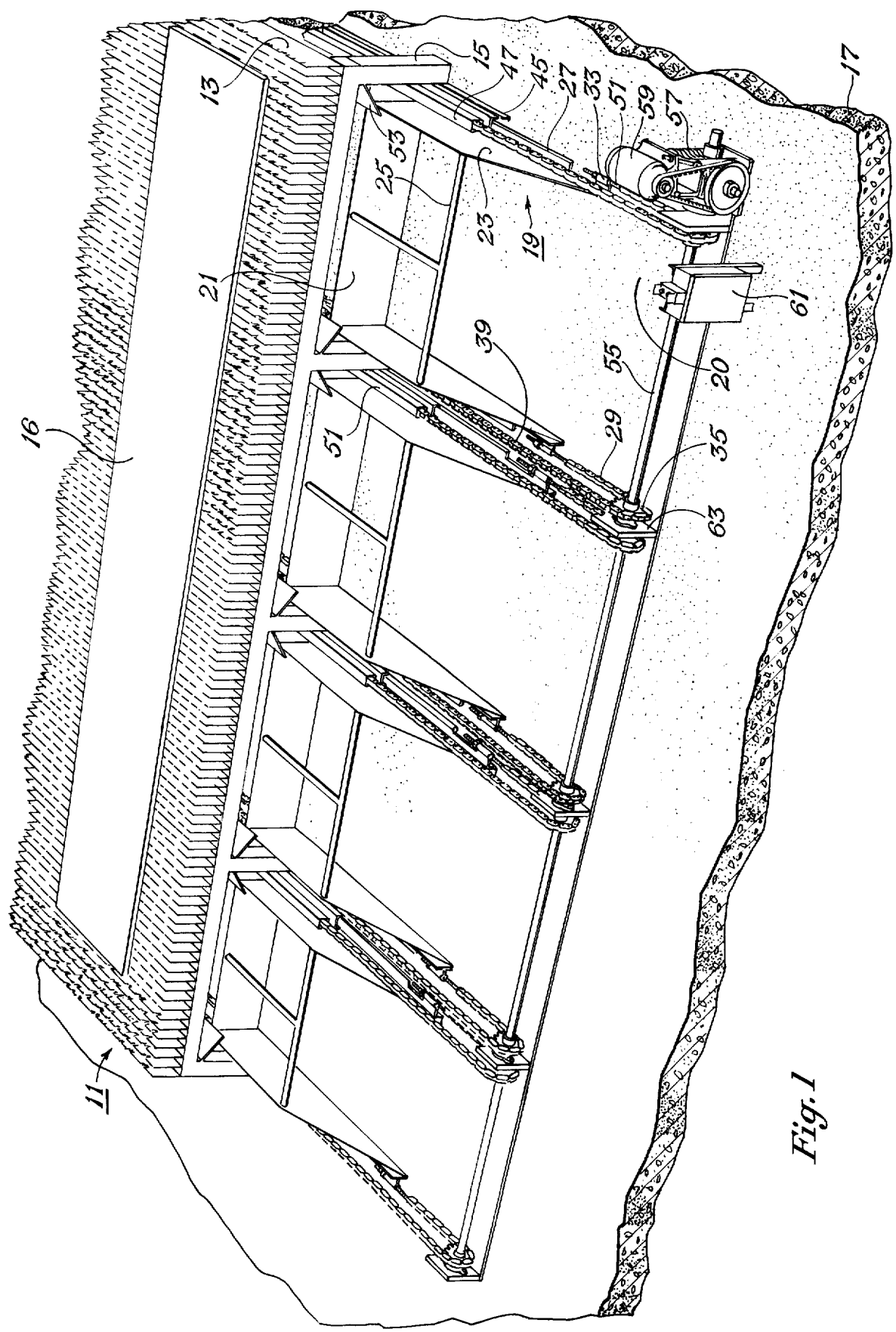
FIG. 1 is a partial perspective view of a flame cutting table and an apparatus for removing fallen slag improved in accordance with this invention.
Figure 2:
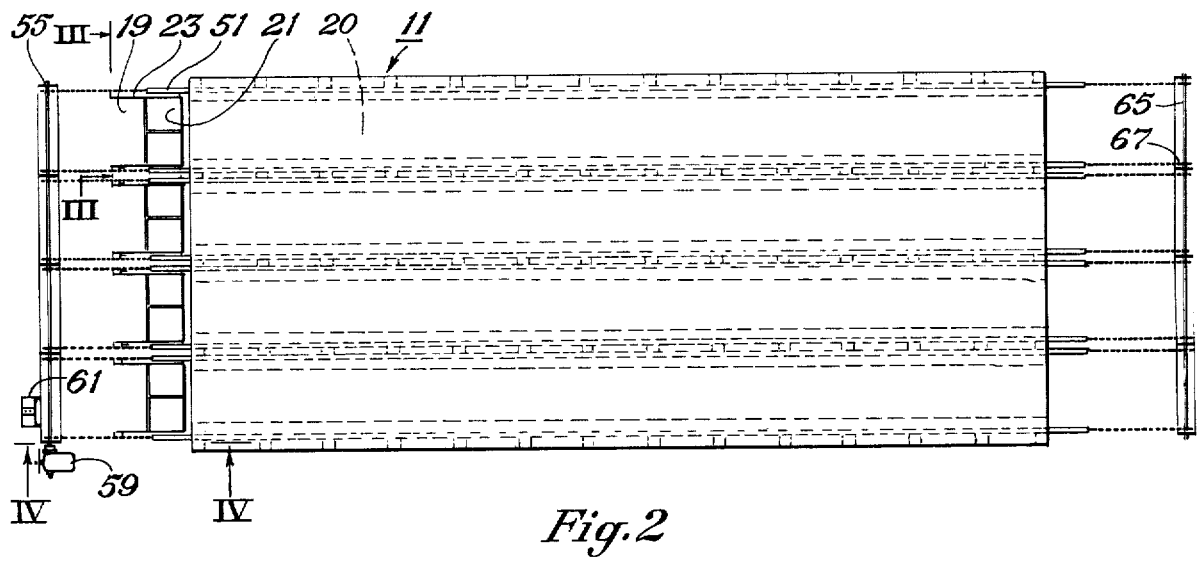
FIG. 2 is a top plan view of the flame cutting table and apparatus of FIG. 1.

FIG. 1 shows a portion of a flame cutting table 11, not including the flame cutting mechanism and control. Table 11 is comprised of a plurality of vertically mounted plates 13, forming a grid and supported by a plurality of legs 15. Table 11 is comprised of several smaller tables or sections grouped in association with each other to define a large table of approximate dimensions 23 feet by 90 feet. During flame cutting operations, a workpiece 16 is placed on plates 13 while torches cut the workpiece in the desired shape, with slag from the cuttings falling beneath the table to the concrete floor 17, FIG. 3.

Four scrapers or scoops 19 are positioned beneath table 11 to be drawn along a path 20 between legs 15. Each scoop 19 has an end 21 and two sides 23 that are parallel to each other. Cross-members 25, comprising flat metal strips, connect the sides 23 and end 21 together for additional strength. There is no bottom and scoop 19 rests directly on concrete floor 17.

Figure 3:
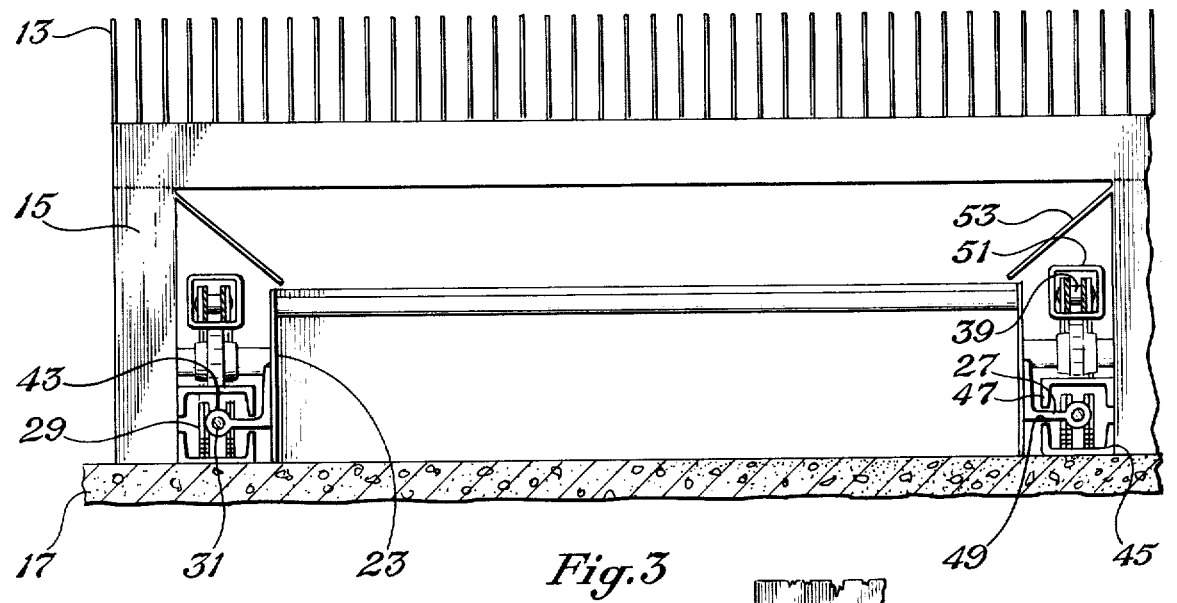
FIG. 3 is a cross-sectional view of FIG. 1 taken along the lines III—III.
Figure 4:
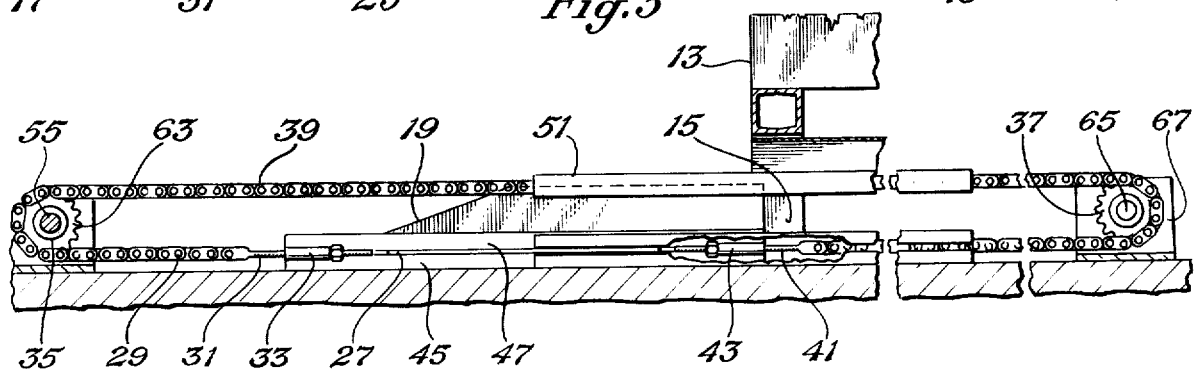
FIG. 4 is a cross-sectional and partly broken away view of FIG. 2 taken along the lines IV—IV.

Referring to FIGS. 3 and 4, a flange 27 is welded to each side 23 of scoop 19. Flange 27 projects laterally a short distance, and extends along the length of side 23. The dimensions of scoop 19 are approximately four feet wide and six feet long. The height of the end 21 and sides 23 is approximately 13 inches, with the forward portion of sides 23 tapered downward.

A chain 29 is swaged to a bolt 31, and the bolt screwed into a threaded receptacle 33. Receptacle 33 is welded to the leading edge of flange 27. Chain 29 extends around front sprocket 35, then returns to rear sprocket 37. The return portion 39 of chain 29 extends around sprocket 37, with the other end of chain 29 swaged to a bolt 41, FIG. 4. Bolt 41 is screwed into a threaded receptacle 43 that is welded to the trailing end of flange 27, adjacent end 21 of scoop 19. Bolts 31 and 41 may be adjusted for desired chain tightness.

Guide means for guiding scoop 19 along path 20 parallel to the sides of table 11 consist of a housing extending around flange 23, comprising two lengths of channel iron, or channel members 45, 47, FIG. 3, mounted to the table on both sides of scoop 19. The lower channel member 45 is positioned with its flat side on the floor, its channel facing upward, and one side is welded to table legs 15. The upper channel member 47 is mounted with its channel opposing the other; the channel faces downward in alignment with channel member 45, and one side is welded to a table leg 15. Channel 47 is mounted slightly above channel 45, leaving a gap or slot 49 between their edges that faces toward path 20 of scoop 19. Slot 49 is approximately one inch wide, sufficient for the reception of flange 27. Flange 27 is a co-acting member of the guide means cooperating with the combination formed by the channel members. Channel members 45, 47 could be formed in a single piece rather than separate strips of channel iron.

A square tube 51 is mounted to table legs 15 directly above channel members 45, 47. Tube 51 is of a size sufficient to receive the return portion 39 of chain 29. Tube 51 serves as chain support means for carrying chain 29, preventing it from becoming jammed between scoop 19 and channel members 45, 47.

A deflector shield 53 is mounted directly above tubing 51. Shield 53 is a flat plate inclining downward at approximately 45°. Shield 53 deflects falling slag away from tubing 51 and channel members 45, 47 toward the center of path 20.

Front sprockets 35 are connected to a drive mechanism or means comprising an axle 55, which in turn is directly connected to a gear reduction box 57 and electric motor 59. Manual control 61 places sprockets 35 into either forward or reverse position. Axle 55 is journaled into mounts 63 which are bolted to floor 17, and sprockets 35 are directly coupled to axle 55.

Rear sprockets 37 are similarly attached to an axle 65 journaled to mounts 67 that are bolted to floor 17. The distance between rear axle 65 and the end of table 11 is sufficient for scoops 19 to remain clear of falling slag while not being used. Front axle 55 is at a distance sufficient for end 21 of scoop 19 to clear table 11, to insure that all of the slag will be in a position to be picked-up by a magnet.

During operation of the flame cutting table 11, when slag reaches a depth of around one inch in any significant area, motor 57 will be manually activated to drag scoop 19 forward. Since sides 23 of the scoop 19 are relatively long, there should be no jamming or wedging resulting from different chain lengths. Slag will be collected and build-up towards end 21 of scoop 19, with very little slag being pushed outward into the guide means. Chain 29 will be drawn through the space defined by channel members 45, 47, returning through tube 51. When the scoops 19 reach the front end of table 11, motor 57 is immediately reversed manually, dragging scoops 19 back to their initial position. The piles of slag are removed by an overhead magnet.

It can readily be seen that an invention having significant improvements has been provided. The scraper or scoop effectively picks up slag without pushing the slag to the edges of the path, and does not tend to bind should the chain become unequal in length. A guide means is provided that guides the scoop and also guides and protects the chains from heat.

Although the invention has been described with a certain degree of particularity, it is understood that numerous changes in the details of construction may be resorted to without departing from the spirit and the scope of this invention.

I claim:

1. An improved apparatus for removing fallen slag from beneath a flame cutting table of the type having powered means for raking the slag along a path between legs of the table, the improvement comprising:
   a scoop having two parallel sides and one end positioned beneath the table on the path for raking the slag;
   chain drive means connected to the sides of the scoop having vertically mounted sprockets positioned on opposite sides of the path and on opposite ends of the table; and
   guide means for guiding the scoop along the path substantially parallel to the sides of the table, said guide means having two co-acting members, one being fastened to the side of the scoop and the other being fastened to a table on opposite sides of the path.

2. The apparatus of claim 1 wherein the guide means comprises:
   a pair of opposing channel members mounted to the table on each side of the path so that a slot is defined by their opposing edges; and
   a flange connected to each side of the scoop and extending laterally into the slot.

3. The apparatus of claim 2 wherein the chain drive means includes a chain attached to the edge of the flange and carried within the space defined by the two channel members.

4. The apparatus of claim 1 additionally comprising a chain support means attached to the table above the channel members for carrying the return portion of the chain.

5. An apparatus for removing fallen slag from beneath a flame cutting table, comprising:
   a scoop positioned beneath the table and having two parallel sides, an end and a flange extending laterally from each side;
   a pair of sprockets vertically aligned on opposite sides of the scoop and on opposite ends of the table;
   an elongated housing positioned beneath and extending the length of the table on opposite sides of the scoop, said housing having a horizontal slot for the reception of the flange;
   a chain having one end attached to the leading end of the flange and the other end attached to the trailing end of the flange, extending through the housing and around both sprockets; and
   drive means in engagement with the sprockets to rotate and drag the scoop.

6. The apparatus of claim 5 further comprising a tube mounted to the table above the housing for receiving the return portion of the chain.

7. The apparatus of claim 6 wherein the housing comprises a pair of channel members mounted opposing each other and aligned to define a slot.

* * * * *